United States Patent Office 3,183,246
Patented May 11, 1965

3,183,246
1,1-DIOXOTHIENYLCARBAMATES
Herman E. Faith, Indianapolis, Ind., assignor to The Dow Chemical Company, Midland, Mich., a corporation of Delaware
No Drawing. Filed Sept. 10, 1962, Ser. No. 222,630
6 Claims. (Cl. 260—332.1)

The invention relates to novel organic compounds and more particularly relates to N,N-dimethylcarbamates of 1,1-dioxothienols. The 1,1-dioxothienyl group present in the molecule is either the 1,1-dioxo-tetrahydro-3-thienyl (3-sulfolanyl) group with or without substitution in the 4 position, or the 1,1-dioxo-2,3-dihydro-3-thienyl group, illustrated respectively as follows:

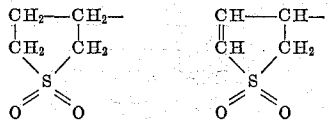

The present compounds are represented by the following structural formula:

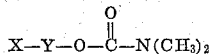

wherein X=H, halide, or —N(CH$_3$)$_2$ and Y=3-sulfolanyl radical, or 1,1-dioxo-2,3-dihydro-3-thienyl radical, each having X as a substituent in the 4 position.

The present invention also includes the hydrohalide and methohalide salts of these carbamates. The present compounds in free base form are crystalline solids which are moderately soluble in the more polar and basic organic solvents, and of rather low solubility in water. In the form of the hydrohalide and methohalide salts, the present compounds exhibit moderate solubility in water and the less basic organic solvents.

The present carbamates are adapted to be employed as active toxicants in compositions for the control of intestinal parasites in warm blooded animals, especially the helminths which invade the intestinal tract.

The compounds of the invention may be prepared by reacting the appropriate 1,1-dioxothienol with an excess of N,N-dimethylcarbamyl chloride. The reaction may be carried out in the presence of a hydrogen chloride acceptor, if desired, unless a substituent on the 1,1-dioxothienyl group, such as bromide, is subject to removal, in which case the hydrogen chloride acceptor is omitted.

After the reaction is completed in the presence of a hydrogen chloride acceptor, ether is added to the reaction mixture to precipitate the hydrochloride salt of the hydrogen chloride acceptor which is then filtered off. Hydrogen chloride is then added to the filtrate to obtain the hydrochloride salt of the carbamate. The hydrochloride salt is filtered off, and purified, if desired, by recrystallization from ethanol.

In the event the reaction is carried out in the absence of solvent medium, the excess carbamyl chloride is distilled off under reduced pressure at the end of the reaction period. The residue is washed with ether and purified, if desired, by recrystallization from a hexane-benzene mixture. After the reaction is completed, the excess of carbamyl chloride is distilled off under reduced pressure, and the residue is suspended in ether and filtered.

The 3-sulfolanols employed may be obtained by reaction of 3,4-epoxy-sulfolane with the appropriate reagent, e.g., dimethylamine or hydrogen bromide, to get the desired substituent on the ring.

More generally, the 4-bromo-3-hydroxysulfolane is prepared by reacting 2,5-dihydrothiophene 1,1-dioxide in acetone with N-bromosuccinimide.

3,4-epoxysulfolane is made as understood in the art by the reaction of 4-bromo-3-hydroxysulfolane with barium carbonate.

The 1,1-dioxo-2,3-dihydro-3-thienyl compounds are most readily prepared from the corresponding sulfolanyl compound by dehydrohalogenation.

The following examples serve to illustrate the invention and are not to be construed as limiting.

EXAMPLE 1

*4-dimethylaminosulfolan-3-yl N,N-dimethylcarbamate*

A 57-milliliter portion of liquid dimethylamine was reacted with 2.5 grams (0.186 mole) of 3,4-epoxysulfolane in a sealed pressure tube for 16 hours at 25° C. and then 1 hour at 40° C. The contents of the pressure tube were removed and the solid base obtained was washed with several portions of warm benzene. The benzene washings were concentrated under reduced pressure and the residue obtained was washed with chloroform. The so-washed residue was freed of chloroform and 30 grams (0.139 mole) of the so-obtained alcohol was suspended in 95 milliliters of dry triethylamine. 34 milliliters of dimethylcarbamyl chloride was added to the alcohol-amine mixture and heated at 100° C. for 2.5 hours. The mixture was then allowed to cool before diluting with anhydrous ether and filtering to remove triethylamine hydrochloride. The solution of the free base in ether was then treated with hydrogen chloride to precipitate the hydrochloride. The hydrochloride was filtered off and recrystallized from absolute ethanol. The hydrochloride salt product exhibited a melting range of 207–209° C. and was obtained in a yield of 66 percent.

A portion of the ether solution containing the free base described above was heated to remove the ether. The base was then taken up in ethyl acetate and reacted with methyliodide at 40° C. to obtain the methohalide. The methoiodide salt was recrystallized rapidly from absolute ethanol. The methoiodide salt exhibited a melting range of 167–168° C. and was recovered in 96 percent yield based on the free base obtained from the ether solution.

EXAMPLE 2

*4-bromosulfolan-3-yl N,N-dimethylcarbamate*

A 10-gram quantity of 4-bromo-3-hydroxysulfolane was heated for 2.5 hours at 105° C. with 11.8 milliliters of dimethylcarbamyl chloride. At the end of the reaction period, unreacted dimethylcarbamyl chloride was removed by vacuum distillation and the residue was suspended in ether and filtered. The recovered solids were recrystallized three times from hexane containing a minor amount of benzene. The so-obtained carbamate exhibited a melting range of 122–123° C. and was obtained in 71 percent yield.

The corresponding 4-chlorosulfolanyl and 4-iodosulfolanyl compounds may be prepared in a similar manner to the foregoing example using 4-chloro-3-hydroxy-sulfolane and 4-iodo-3-hydroxysulfolane, respectively, in place of 4-bromo-3-hydroxysulfolane.

EXAMPLE 3

*1,1-dioxo-2,3 dihydro-3-thienyl N,N-dimethylcarbamate*

The carbamate described in Example 2 in the amount of 9 grams was refluxed for 40 minutes with 3.4 grams of potassium acetate in 30 milliliters of methanol. After the reaction mixture had cooled, solids were filtered off and methanol was removed from the filtrate under reduced pressure. The resulting residue was dissolved in chloroform, filtered, concentrated to dryness and recrystallized from ether containing ligroin. The so-obtained carbamate exhibited a melting range of 87–88.5° C. and was obtained in 62 percent yield.

The compounds of the invention are generally employed in the form of a hydrohalide salt or a methohalide salt because of the greater water solubility of the salts than the free base. In general any of these salts may be prepared by the addition of the requisite hydrogen halide or methyl halide to an ether solution of the carbamate.

In administering a compound of the invention as an active toxicant for the control of helminths, the compound may be administered in a number of ways, e.g., in daily dosage amounts in gelatin capsules, or the compound may be incorporated in the drinking water or the feed diet of the animal. Feed compositions are generally prepared to contain from about 0.01 to 1 percent by weight of one of the present compounds.

In representative operations, mice naturally infested with tapeworms were fed a diet containing 4-dimethylaminosulfolan-3-yl N,N-dimethylcarbamate hydrochloride at a level of 0.06 percent by weight. At the end of a 1-week test period, necropsy showed complete clearance of tapeworms.

In further operations, mice naturally infested with pinworms were fed a diet containing 4-dimethylaminosulfolan-3-yl N,N-dimethylcarbamate hydrochloride at a level of 0.06 percent by weight. At the end of a 1-week test period, necropsy showed complete clearance of pinworms.

I claim:
1. A dioxothienylcarbamate selected from the group consisting of compounds having the formula

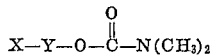

wherein X is a member of the group selected from H, halide and dimethylamino; and Y is a member of the group selected from the 3-sulfolanyl radical and the 1,1-dioxo-2,3-dihydro-3-thienyl radical, said X being a substituent in the 4 position of said Y, and the hydrohalide and methohalide salts of the compound.

2. 1,1-dioxo-2,3-dihydro-3-thienyl N,N - dimethylcarbamate.
3. 3-sulfolanyl N,N-dimethylcarbamate.
4. 4-halosulfolan-3-yl N,N-dimethylcarbamate.
5. 4-dimethylaminosulfolan - 3 - yl N,N - dimethylcarbamate.
6. 4-bromosulfolan-3-yl N,N-dimethylcarbamate.

References Cited by the Examiner

UNITED STATES PATENTS

| | | | |
|---|---|---|---|
| 2,393,925 | 1/46 | Morris et al. | 260—332.1 |
| 2,460,233 | 1/49 | Morris et al. | 260—332.1 |
| 3,075,995 | 1/63 | Pyne | 260—332.1 |

OTHER REFERENCES

The Van Nostrand Chemist's Dictionary, Van Nostrand Co., Inc., New York (1953), pp. 301–302.

IRVING MARCUS, *Primary Examiner.*

NICHOLAS S. RIZZO, WALTER A. MODANCE, *Examiners.*